US010733579B2

(12) United States Patent
Mikelonis et al.

(10) Patent No.: US 10,733,579 B2
(45) Date of Patent: Aug. 4, 2020

(54) SYSTEMS AND METHODS FOR SELF-SERVICE RECYCLING OF AUTOMOTIVE PARTS

(71) Applicant: Row52, LLC, Portland, OR (US)

(72) Inventors: Jon Mikelonis, Sparks, NV (US); Chirag Asaravala, Alamo, CA (US); Duane Allen Massie, Newberg, OR (US); Nicholas Charles Karras, Vancouver, WA (US)

(73) Assignee: ROW52, LLC, Portland, OR (US)

( * ) Notice: Subject to any disclaimer, the term of this patent is extended or adjusted under 35 U.S.C. 154(b) by 330 days.

(21) Appl. No.: 15/698,466

(22) Filed: Sep. 7, 2017

(65) Prior Publication Data

US 2017/0372274 A1    Dec. 28, 2017

Related U.S. Application Data

(63) Continuation-in-part of application No. 15/017,494, filed on Feb. 5, 2016, now abandoned, which is a
(Continued)

(51) Int. Cl.
*G06Q 10/00* (2012.01)
*G06Q 30/06* (2012.01)
(Continued)

(52) U.S. Cl.
CPC .............. *G06Q 10/30* (2013.01); *G05B 15/02* (2013.01); *G06Q 10/087* (2013.01);
(Continued)

(58) Field of Classification Search
CPC ................................ G06Q 10/00; G06Q 40/00
(Continued)

(56) References Cited

U.S. PATENT DOCUMENTS

| 4,037,302 A | 7/1977 | Hollander et al. |
| 5,319,542 A | 6/1994 | King, Jr. et al. |

(Continued)

FOREIGN PATENT DOCUMENTS

| EP | 1696381 A1 | 8/2006 |
| EP | 1993068 A2 | 11/2008 |

(Continued)

OTHER PUBLICATIONS

Automotive Recycling (A Global Industry on the Rise), Mar. 2011, I vol. 31 No. 2, pp. 1-64 (Year: 2011).*

(Continued)

*Primary Examiner* — Romain Jeanty
(74) *Attorney, Agent, or Firm* — Perkins Coie LLP

(57) ABSTRACT

Systems and methods for self-service recycling are provided. In particular, some embodiments include graphical user interfaces and backend systems that allow users to engage in remote inquiries of available salvage automotive parts in salvage yards. A user makes a request for a type of recyclable assembly. Examples of types of recyclable assemblies include, but are not limited to, automobiles, tractors, electronic devices, home appliances, and vending machines. The request is compared to a database of end-of-life vehicles across a number of salvage yards. When a salvage yard is identified as having the specified end-of-life vehicle, local parts pullers who are on site are notified and a communication channel between the parts puller and the user is initiated. This is facilitated through geofencing and location aware devices. Using this information, the user can determine if any of the identified parts remain on the vehicle and may purchase the parts from the SSAR facility for resale. The system then assists the user in creating descriptions for postings on the Internet and/or otherwise connecting the user with potential purchasers.

20 Claims, 16 Drawing Sheets

Related U.S. Application Data continuation of application No. 13/754,407, filed on Jan. 30, 2013, now abandoned.

(51) Int. Cl.
  *G06Q 30/02* (2012.01)
  *G06Q 10/08* (2012.01)
  *G05B 15/02* (2006.01)

(52) U.S. Cl.
  CPC ..... *G06Q 30/0201* (2013.01); *G06Q 30/0202* (2013.01); *G06Q 30/0206* (2013.01); *G06Q 30/0627* (2013.01); *G06Q 30/0641* (2013.01); *Y02W 90/20* (2015.05)

(58) Field of Classification Search
  USPC ........................................................ 705/7.31
  See application file for complete search history.

(56) References Cited

U.S. PATENT DOCUMENTS

| | | | |
|---|---|---|---|
| 6,226,617 B1 | 5/2001 | Suzuki et al. | |
| 6,263,322 B1 | 7/2001 | McIntyre et al. | |
| 6,338,045 B1 | 1/2002 | Pappas | |
| 6,594,877 B2 | 7/2003 | Kamiota et al. | |
| 6,611,814 B1 | 8/2003 | Lee et al. | |
| 6,922,675 B1 | 7/2005 | Chatterjee et al. | |
| 7,054,824 B1 | 5/2006 | Keene et al. | |
| 7,356,394 B2 | 4/2008 | Burgess | |
| 7,418,408 B1 | 8/2008 | Heppe et al. | |
| 7,901,532 B2 * | 3/2011 | Bain | C09J 5/06 156/247 |
| 7,945,478 B2 | 5/2011 | Hogan et al. | |
| 8,140,411 B2 | 3/2012 | Staats et al. | |
| 8,280,782 B1 | 10/2012 | Talreja et al. | |
| 8,447,632 B2 | 5/2013 | Hogan et al. | |
| 8,473,365 B2 | 6/2013 | Scruton et al. | |
| 9,363,635 B2 * | 6/2016 | Finlow-Bates | H04W 4/021 |
| 2001/0053995 A1 | 12/2001 | Nishimoto et al. | |
| 2002/0072974 A1 | 6/2002 | Pugliese, III et al. | |
| 2002/0148090 A1 | 10/2002 | Kaburagi et al. | |
| 2003/0050843 A1 | 3/2003 | Onoue | |
| 2003/0093380 A1 | 5/2003 | Esmailzadeh et al. | |
| 2004/0034566 A1 | 2/2004 | Nagata et al. | |
| 2004/0181422 A1 | 9/2004 | Brand et al. | |
| 2004/0210334 A1 | 10/2004 | Tateishi et al. | |
| 2004/0236641 A1 | 11/2004 | Abbott et al. | |
| 2005/0137919 A1 | 6/2005 | Buckley et al. | |
| 2005/0187834 A1 * | 8/2005 | Painter | G06Q 10/08 705/28 |
| 2006/0155430 A1 | 7/2006 | Burgess | |
| 2007/0011082 A1 | 1/2007 | Lynch et al. | |
| 2007/0156675 A1 * | 7/2007 | Dalton | G06Q 10/087 |
| 2007/0179861 A1 | 8/2007 | Woodfin et al. | |
| 2007/0255619 A1 | 11/2007 | Ekchian et al. | |
| 2008/0031008 A1 | 2/2008 | Ogino et al. | |
| 2008/0154737 A1 | 6/2008 | Linkswiler | |
| 2008/0183600 A1 | 7/2008 | Bowser et al. | |
| 2008/0215366 A1 | 9/2008 | Robson et al. | |
| 2008/0288346 A1 | 11/2008 | Shames | |
| 2011/0010276 A1 | 1/2011 | Bowser et al. | |
| 2012/0030046 A1 | 2/2012 | Fullerton et al. | |
| 2012/0036033 A1 | 2/2012 | Seergy et al. | |
| 2012/0190386 A1 | 7/2012 | Anderson | |
| 2012/0191817 A1 | 7/2012 | Sayan et al. | |
| 2012/0278128 A1 | 11/2012 | Danzan | |
| 2014/0128095 A1 * | 5/2014 | Finlow-Bates | H04W 4/021 455/456.1 |
| 2014/0162692 A1 * | 6/2014 | Li | H04L 67/40 455/456.3 |

FOREIGN PATENT DOCUMENTS

| | | |
|---|---|---|
| KR | 20090000641 | 1/2009 |
| KR | 101061094 | 8/2011 |
| KR | 101189604 | 10/2012 |
| WO | 0247001 A2 | 6/2002 |

OTHER PUBLICATIONS

International Search Report and Written Opinion dated May 19, 2014, for International Patent Application No. PCT/US2014/013670 filed Jan. 30, 2013, 14 pages.
Car-Part.com—Product Web Pages, Car-Part, Feb. 2009, Retrieved from Archive.org Oct. 26, 2015.
Car-Part.com—Product Web Pages, Car-Part, Mar. 2004, Retrieved from Archive.org Oct. 26, 2015.
Car-Part.com—Product Web Pages, Car-Part, Mar. 2010, Retrieved from Archive.org Oct. 26, 2015.
Car-Part.com—Product Web Pages, Car-Part, Sep. 2008, Retrieved from Archive.org Oct. 26, 2015.
Fasano, J.P. et al., "Optimizing Reverse Logistics Scenarios: A Cost Benefit Study Using IBM's WIT," Tool IEEE, 2002.
Final Office Action dated Nov. 5, 2015, in U.S. Appl. No. 13/754,407, filed Jan. 30, 2013.
www.junkyard.recycleinme.com/, downloaded on Jan. 25, 2013.
www.libertyautoparts.com/recycle.htm, downloaded on Jan. 25, 2013.
www.automotix.net/, downloaded on Jan. 25, 2013.
www.junkyarddog.com/, downloaded on Jan. 25, 2013.
www.justparts.com/, downloaded on Jan. 25, 2013.
www.libertyautoparts.com/inventory/retail.htm, downloaded on Jan. 25, 2013.
International Search Report and Written Opinion dated May 19, 2014, in International Patent Application No. PCT/US2014/013670 filed Jan. 30, 2013, 14 pages.
"Meacham, Anu et al., Optimal Disassembly Configurations for Single and Multiple Products," Journal of Manufacturing Systems, vol. 18, No. 5, 1999.
Non-Final Office Action dated Apr. 15, 2015, in U.S. Appl. No. 13/754,407, filed Jan. 30, 2013.
PartingOut.com Web Pages, PartingOut, Feb. 2011, Retrieved from Archive.org Mar. 25, 2015.
PartingOut.com Web Pages, PartingOut, Jun. 3, 2003, Retrieved from Archive.org Mar. 25, 2015.
Requirement for Restriction dated Feb. 20, 2015, in U.S. Appl. No. 13/754,407, filed Jan. 30, 2013.
"Rhodes, Famous, Selling Parts on eBay—Best Practices from Best Sellers," DealersEdge, 2008.
"ThePartsTrader.com—Forum, ThePartsTrader," Feb. 16, 2007, Retrieved from Archive.org Oct. 26, 2015.
U.S. Appl. No. 13/754,407 by Mikelonis, et al. filed Jan. 30, 2013.
"Vehicle Recycling Manual: A Guide for Vehicle Recyclers," May 2011, pp. 1-45, Publication No. 97-433, Department of Ecology—State of Washington—Hazardous Waste and Toxics Reduction Program.

* cited by examiner

SYSTEMS AND METHODS FOR SELF-SERVICE RECYCLING OF AUTOMOTIVE PARTS

CROSS REFERENCE TO RELATED APPLICATIONS

This application is a continuation-in-part of U.S. patent application Ser. No. 15/017,494, entitled "SYSTEMS AND METHODS FOR SELF-SERVICE RECYCLING OF AUTOMOTIVE PARTS", filed on Feb. 5, 2016, which is a continuation of U.S. patent application Ser. No. 13/754,407, entitled "SYSTEMS AND METHODS FOR SELF-SERVICE RECYCLING OF AUTOMOTIVE PARTS", filed on Jan. 30, 2013, of which are incorporated herein in their entirety by this reference thereto.

TECHNICAL FIELD

Various embodiments of the present invention generally relate to identifying availability of recycled automotive parts. More specifically, various embodiments of the present invention relate to systems and methods for self-service recycling.

BACKGROUND

There are several hundred self-service automotive recycling (SSAR) facilities around the United States and other countries. These facilities can include many types of vehicles and other machines which have parts that can be retrieved and reused. In the case of automobiles, for example, the SSAR facility may purchase vehicles from individuals, insurance companies, towing companies, charities, private companies, and/or auto auctions. These vehicles are referred to as "End-of-Life Vehicles" or "ELVs." ELVs may not be operational and may be damaged. However, there may be many working parts on each of the vehicles. Each facility may stock thousands of vehicles or machines and constantly add recyclable assemblies to the facility's inventory.

Customers are able to search the facility and find recyclable assemblies (e.g., cars) and the parts they need. While many yards are well organized and the recyclable assemblies may even be grouped by year, make, and model, the parts on the individual automobiles, machines, or other recyclable assemblies are not added to the inventory. As a result, it is up to customers to search and find the parts they need and remove the parts with their own tools. When customers are finished, they typically bring the parts to a cashier for purchase before leaving the self-service recycling facility.

Not only does each recycling facility have an inventory that is constantly changing, but there is no efficient way for customers to determine whether parts are available within each facility, especially at salvage yards inconvenient distances away. As a result, many parts are left on the recyclable assembly which could easily be sold for a profit by customers. As such, there are a number of challenges and inefficiencies found in self-service recycling facilities.

SUMMARY

Various embodiments of the present invention relate to systems and methods for self-service recycling. Some embodiments utilize a method that includes receiving, through a communications network, a request from a user for a type of recyclable assembly. Examples of types of recyclable assemblies include, but are not limited to, automobiles, tractors, electronic devices, home appliances, and vending machines. The request is compared to a database of ELV's across a number of salvage yards. When a salvage yard is identified as having the ELV, local parts pullers who are on site are notified and a communication channel between the parts puller and the user is initiated. This is facilitated through geofencing and location aware devices.

The request from the user can include a variety of information, such as, but not limited to, make, model, and year of the type of automobile or other recyclable assembly. Then, a generic list of parts associated with the type of automobile or other recyclable assembly can be determined and a market analysis generated that includes determining information (e.g., recent prices and/or number of people actively seeking each part) for the generic list of parts. The market analysis can be presented to the user. In some embodiments, the market analysis can include at least a portion of the generic list of parts that have the highest demand. The market analysis may also present to the user other information, such as comments from other users on specific recyclable assemblies of the same type that are located nearby. In at least one embodiment, generating the market analysis includes searching listings requesting parts needed from the type of automobile or other recyclable assembly and/or determining recent prices for each part in the generic list of parts.

Various embodiments of the present invention can generate one or more graphical user interface screens which can be viewed, for example, on a mobile device. For example, in one embodiment, a graphical user interface screen can be generated to facilitate private messages between a remote buyer and a local seller, facilitate the exchange of payment between a buyer and a seller, and facilitate the exchange of information between users and between users and components of the system. For example, in one embodiment, a graphical user interface screen can receive a request from a user to have someone view one of the self-service recyclable assemblies (e.g., a specific automobile) and determine if a part is available.

Embodiments of the present invention also include computer-readable storage media containing sets of instructions to cause one or more processors to perform the methods, variations of the methods, and other operations described herein.

Various embodiments of the present invention provide for a system that includes a database, an identification module, a market analysis module, an inventory management module, a parts identification module, a valuation module, a resell module, a geolocation module, a geofencing module, and/or a notification module. Each of the modules may be implemented in software, hardware, or a combination thereof. The modules are implemented on a backend server, and are supported by client software with respect to user mobile devices and web portals.

The database can be used to store a plurality of data entries. Each of the data entries can be associated with a type of self-service recyclable assembly and a generic parts list representative of parts typically found on that type of self-service recyclable assembly that can be removed and reused. The identification module can receive requests from users that include a search query that can be used to identify a matching data entry. The market analysis module can receive the matching data entry and generate a market analysis of the generic parts list associated with the type of self-service recyclable assembly associated with the matching data entry.

The geolocation module and the geofencing module coordinate to generate geofences around salvage yards that are used to monitor the presence of salvage pickers. Users wishing to purchase salvaged car parts make a search query into a web-based search engine. The search engine queries the inventory management module and database to determine a salvage yard that may have the requested part. Then the server puts the user in communication with a salvage picker who is on-site based on the salvage picker's mobile device relative to the geofence of the salvage yard.

The inventory management module can receive inventory reports from self-service recycling facilities that have self-service recyclable assemblies. The inventory report can be processed and used to create, remove, or update data entries in the database for each of the self-service recyclable assemblies listed in the inventory report. The identification module can receive the inventory report and determine the type of self-service recyclable assembly and can supplement available information regarding the type of self-service recyclable assembly. The parts identification module can receive the type of self-service recyclable assembly from the identification module and determine the generic parts list for that type of self-service recyclable assembly.

The valuation module can then determine an estimated selling price and an estimated amount of time to sell each part based on historical prices and advertising days. The resell module can be configured to assist a user in selling one or more parts identified in the market analysis. For example, in some embodiments, the resell module can provide default or suggested figures, pictures, and descriptions for the one or more parts the user is reselling. The notification module can monitor and match a list of desired parts with parts being offered for sale.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

Figure 1:
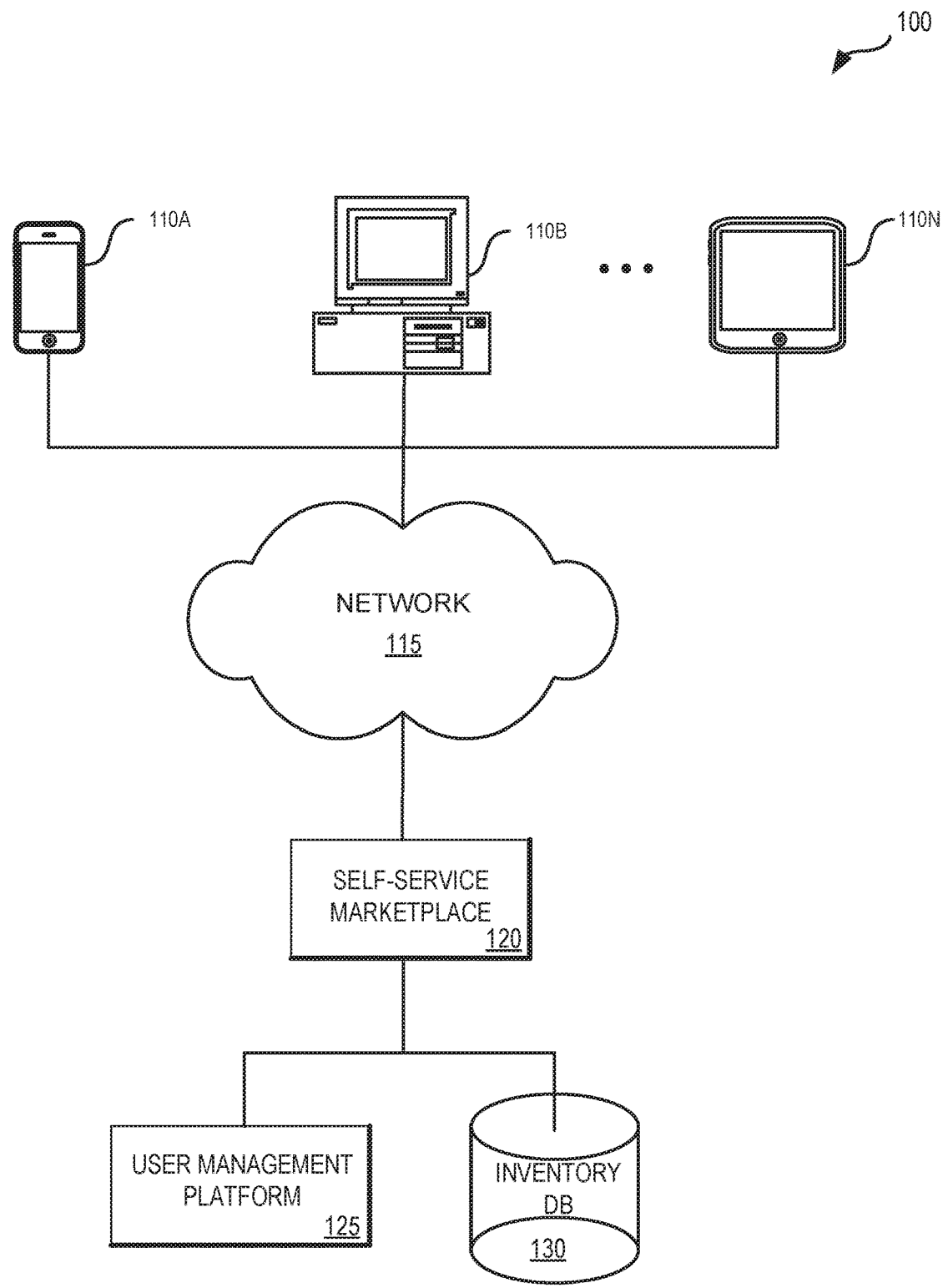
FIG. 1 illustrates an example of a networked-based environment in which some embodiments of the present invention may be utilized.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present invention generally relate to identifying and creating markets for recycled parts. More specifically, various embodiments of the present invention relate to systems and methods for self-service recycling. Some embodiments include graphical user interfaces, mobile applications, back-end systems and other components that allow users to identify the market for used parts (e.g., automotive parts, appliance parts, vending machine parts, etc.). In the case of automobiles, for example, each car in an SSAR facility (or any other location) may be tagged with a code (e.g., a QR code or a bar code) that identifies the vehicle. When the user of the self-service recycling system scans the code, a determination is made regarding which parts are currently needed for Internet sales, recent prices for individual parts, and/or a list of vehicles or other recyclable assemblies which can use these parts.

This information is used to generate a market analysis and is presented to the user through one of the graphical user interface screens. Using this information, the user can determine if any of the identified parts remain on the vehicle and may purchase the parts from the SSAR facility for resale by the user. In some embodiments, the system can also assist the user in creating descriptions for postings on the Internet and/or otherwise connecting the user with potential purchasers (which may be remotely located from the SSAR facility).

Some embodiments provide for a self-service marketplace that includes one or more of the following features: 1) generating a market analysis of parts associated with a self-service assembly type; 2) managing a list of locations which currently have one or more of the self-service assembly types; 3) facilitating social interactions encouraging recycling of one or more parts associated with the self-service assembly type; 4) assisting users in creating advertisements for reselling (e.g., on the Internet) one or more parts; 5) providing alerts and other notifications when desired parts and/or other inventory are added to the system; and/or 6) facilitating social interactions where users can comment on each recyclable assembly and make connections with other users.

While, for convenience, embodiments of the present invention are described with reference to automotive vehicles, embodiments of the present invention are equally applicable to any other self-service recycling assembly. For example, these techniques are equally applicable to electronics, appliances, vending machines, farm equipment, airplanes, motorcycles, bicycles, computers, and any other recyclable assembly from which individuals may pull and reuse parts. In addition, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical disks, compact disc read-only memory (CD-ROM), magneto-optical disks, read-only memory (ROM), random access memory (RAM), erasable programmable read-only memory (EPROM), electrically erasable programmable read-only memory (EEPROM), magnetic or optical cards, flash memory, or other type of media/machine-readable medium suitable for storing electronic instructions.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary channels or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to various embodiments," "in the embodiments shown," "in other embodiments," and the like generally mean the particular feature, structure, or characteristic following the phrase is included in at least one embodiment of the present invention and may be included in more than one embodiment of the present invention. In addition, such phrases do not necessarily refer to the same embodiment or to different embodiments.

If the specification states a component or feature "may," "can," "could," or "might" be included or have a characteristic, that particular component or feature is not required to be included or have the characteristic.

The term "module" refers broadly to software, hardware, or firmware (or any combination thereof) components. Modules are typically functional components that can generate useful data or other output using specified input(s). A module may or may not be self-contained. An application program (also called an "application") may include one or more modules, or a module may include one or more application programs.

General Description

FIG. 1 illustrates an example of a networked-based environment 100 in which some embodiments of the present invention may be utilized. As illustrated in FIG. 1, various computing devices 110A-110N are connected to server 120 through network 115. The server 120 can communicate with user management platform 125 and inventory database 130 to identify and create markets for used parts (e.g., recycled original equipment or aftermarket equipment). For example, the server 120 can store data entries in inventory database 130 to manage inventory of self-service recycling facilities. In addition, the server 120 can generate alerts or notifications based on preferences set by the user. Social interactions can be facilitated among users around inventory and desired parts.

Computing devices 110A-110N can be any computing device capable of receiving user input as well as transmitting and/or receiving data via the network 115. In one embodiment, computing devices 110A-110N can include a conventional computer system, such as a desktop or laptop computer. In another embodiment, computing devices 110A-110N can include a mobile device having computer functionality, such as a personal digital assistant (PDA), mobile telephone, smartphone, or similar device. Computing devices 110A-110N may be configured to communicate with the backend server 120 via network 115. In one embodiment, computing devices 110A-110N can execute an application allowing a user of computing devices 110A-110N to interact with the server 120. For example, computing devices 110A-110N can execute browser applications to enable interaction between computing devices 110A-110N and the server 120 via the network 115. In another embodiment, computing devices 110A-110N can interact with the server 120 through an application programming interface (API) that runs on the native operating system of the computing devices 110A-110N, such as IOS® or ANDROID™.

Computing devices 110A-110N can be configured to communicate via network 115, which may comprise any combination of local area and/or wide area networks, using both wired and wireless communication systems. In one embodiment, network 115 uses standard communications technologies and/or protocols. Thus, network 115 may include links using technologies such as Ethernet, 802.11, worldwide interoperability for microwave access (Wi-MAX), 3G, 4G, CDMA, digital subscriber line (DSL), etc. Similarly, the networking protocols used on network 115 may include multiprotocol label switching (MPLS), transmission control protocol/Internet protocol (TCP/IP), User Datagram Protocol (UDP), hypertext transport protocol (HTTP), simple mail transfer protocol (SMTP), and file transfer protocol (FTP). Data exchanged over network 115 may be represented using technologies and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec).

Figure 2:
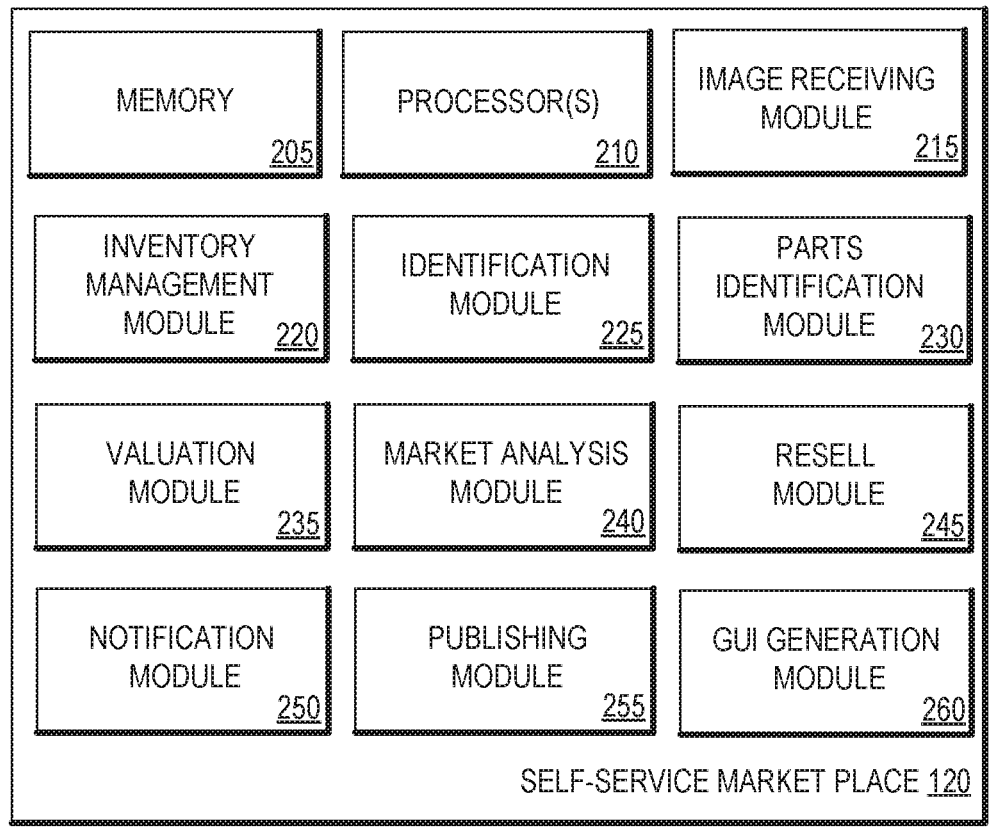
FIG. 2 is a block diagram with components of a self-service marketplace in accordance with various embodiments of the present invention.

FIG. 2 shows a block diagram of various components of the server 120 in accordance with one or more embodiments of the present invention. According to the embodiments shown in FIG. 2, the system can include memory 205, one or more processors 210, image receiving module 215, inventory management module 220, identification module 225, parts identification module 230, valuation module 235, market analysis module 240, resell module 245, notification module 250, publishing module 255, graphical user interface (GUI) generation module 260, a geolocation module 265, and a geofencing module 270.

Other embodiments of the present invention may include some, all, or none of these modules and components along with other modules, applications, and/or components. Still yet, some embodiments may incorporate two or more of these modules into a single module and/or associate a portion of the functionality of one or more of these modules with a different module. For example, in one embodiment, inventory management module 220 and identification module 225 can be combined into a single module for searching for and identifying types of recyclable assemblies at various self-service recycling centers.

Memory 205 can be any device, mechanism, or populated data structure used for storing information. In accordance with some embodiments of the present invention, memory 205 can encompass any type of, but is not limited to, volatile memory, nonvolatile memory, and dynamic memory. For example, memory 205 can be random access memory, memory storage devices, optical memory devices, magnetic media, floppy disks, magnetic tapes, hard drives, single in-line memory modules (SIMMs), synchronous dynamic random access memory (SDRAM), dual in-line memory modules (DIMMs), Rambus dynamic random access memory (RDRAM), double data rate random access memory (DDR RAM), small outline dual in-line memory modules (SODIMMs), erasable programmable read-only memory (EPROM), electrically erasable programmable read-only memory (EEPROM), compact disks, digital video disks (DVDs), and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 205.

Memory 205 may be used to store instructions for running one or more applications or modules on processor(s) 210. For example, memory 205 could be used in one or more embodiments to house all or some of the instructions needed to execute the functionality of image receiving module 215, inventory management module 220, identification module 225, parts identification module 230, valuation module 235, market analysis module 240, resell module 245, notification module 250, publishing module 255, and/or GUI generation module 260.

Image receiving module 215 is designed to receive images from users of the server 120 and associate those images with specific data entries in an inventory database. In addition, inventory management module 220 can create, update, and/or delete data entries using inventory reports received from recycling facilities (e.g., an SSAR facility). In many embodiments, these reports only include basic identifying information about the automobiles or other recyclable assemblies located at the self-service facility. For example, the report may include a unique identifying number along with a make and model of the item. More specific information is provided by users. For example, users may comment on the condition, available parts, or removed parts, and take pictures of the assemblies and submit them to the server 120. Image receiving module 215 receives and processes these images and associates them with the correct data entry.

Identification module 225 can receive requests from users that include a search query. The search query may be used to identify matching data entries in the inventory database. Any information associated with the data entries (e.g., location, pictures, user comments, and the like) can be returned and presented to the user. In addition, these entries can specify a type of automobile or other recyclable assembly, which can be communicated to parts identification module 230. Parts identification module 230 then determines the generic parts list for that type of automobile or other self-service recyclable assembly.

Valuation module 235 receives the generic parts list from parts identification module 230 and then determines an estimated selling price and/or an estimated time to sell based on historical prices and average days on market. This information is then passed to market analysis module 240 along with any other matching data entry. Market analysis module 240 generates a market analysis of the generic parts list associated with the type of self-service recyclable assembly associated with the matching data entry.

Resell module 245 assists a user in selling one or more parts identified in the market analysis. For example, in some embodiments, resell module 245 can provide default figures and descriptions for the one or more parts the user is reselling. The advertisement can be published in one or more venues using publishing module 255. Notification module 250 can monitor these postings and match a list of desired parts with parts being offered for sale.

GUI generation module 260 can generate one or more graphical user interface screens for reviewing the market analysis generated by analysis module 240, proposing content to the user for creating an advertisement to resell one or more parts, and/or allowing users to interact with one another. In some cases, these graphical user interface screens can access inventory databases having stored thereon a plurality of data entries with information regarding the types of automobiles (or other types of recyclable assemblies) available and comments posted by users.

The geofencing module 270 is configured to generate a geofence around salvage yards. The geofence may be established via GPS coordinates, wireless network range, or another suitable method to generate a geofence known in the art. In embodiments where a wireless network range dictates the size of a geofence, the geofencing module 270 may not be, in physical effect, the device establishing the geofence (instead, this is performed by an access point that is on site at the salvage yard); however, the geofencing module 270 facilitates the deployment of the geofence and coordinates with the local access point with geofencing software components.

The geolocation module 265 coordinates with the geofencing module 270 to track mobile devices of salvage picker users ("parts pullers") with reference to the geofences. The geolocation module 265 can identify parts pullers who are located at an auto recycling yard via the geofences located at each salvage yard and share this information to parts buyers. The mobile devices use location aware sensors to report their location to the geolocation module 265. The server informs the parts puller as to vehicles in inventory from which individual parts could be removed to potentially fulfill demand from parts wanted listings and/or specific user requests.

When the server receives parts requests from users for particular parts of particular types of automobiles (e.g. make/model/year) the server compares the request to salvage yard inventories in order to find an end of life vehicle (ELV) that, when new, would have had the requested part. Once an appropriate ELV is found, at a given salvage yard, the server checks the geolocation module 265 for parts pullers whom are at the given salvage yard. With an identified parts puller who is at the salvage yard, the server will open a communication channel between the searching user and the mobile device via a web-based application based on the determination that the mobile device is within the geofence and the receipt of the request. In some embodiments the server may additionally transmit a parts wanted list to other mobile devices associated with other salvage picker users based on the determination that the respective other mobile device are not within the geofence, wherein the parts wanted list includes the particular part and a reference to the salvage yard including the ELV.

Figure 3:
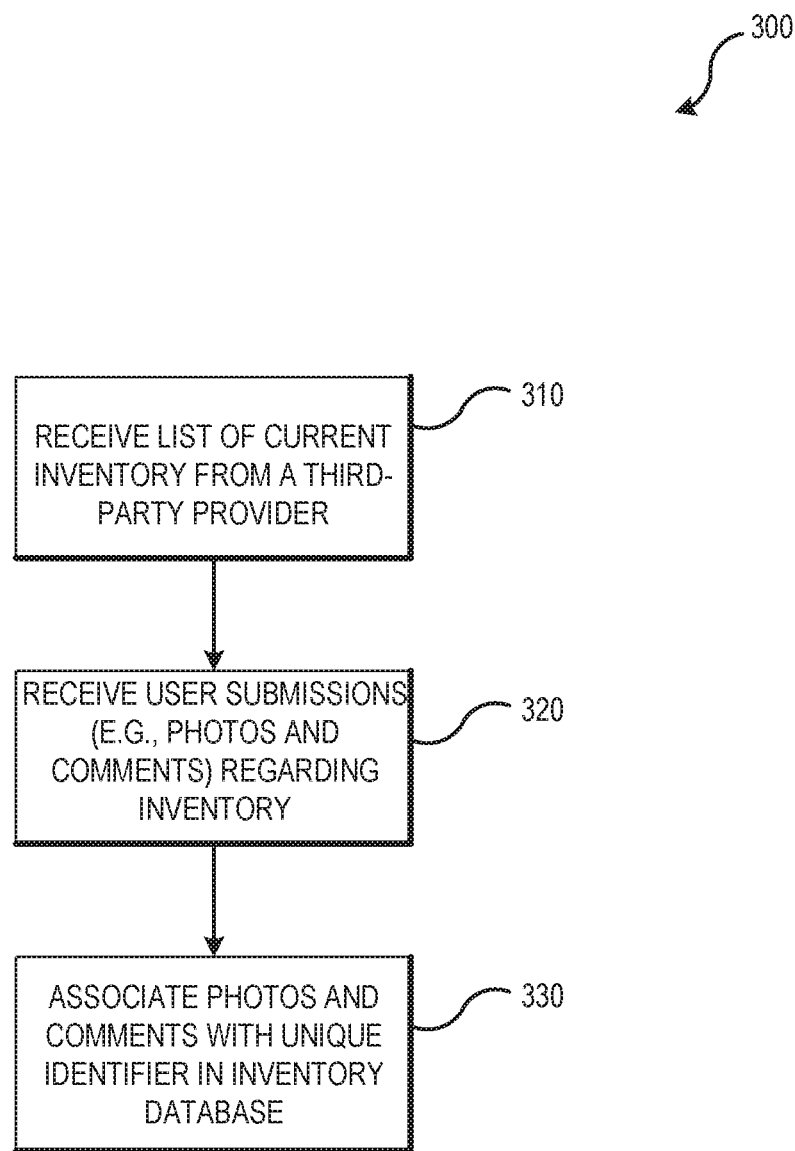
FIG. 3 is a flowchart with a set of operations for associating user information with recyclable assemblies in accordance with one or more embodiments of the present invention.

FIG. 3 is a flowchart with a set of operations 300 for associating user information with recyclable assemblies in accordance with one or more embodiments of the present invention. The operations illustrated in FIG. 3 may be performed in various embodiments by image receiving module 215, inventory management module 220, a processor, and/or other modules, engines, or components of server 120. During receiving operation 310, a list of current inventory can be received from a third party provider (e.g., an individual or self-service facility).

During submission operation 320, users submit photos and comment (e.g., condition, what parts remain, what parts have been removed, etc.) about the inventory. These photos and information are then associated during association operation 330 with a unique identifier in an inventory database. In some embodiments, this information may be presented to other uses as entered. In other embodiments, the information may be processed (e.g., manually and/or automatically) to remove duplicate information and provide a consistent format, or may be reorganized to make the information more user-friendly. Still yet, some embodiments provide for an optional interactive review of the item, for example, a checklist asking the status, condition, and/or other information about the recyclable assembly and/or parts.

Figure 4:
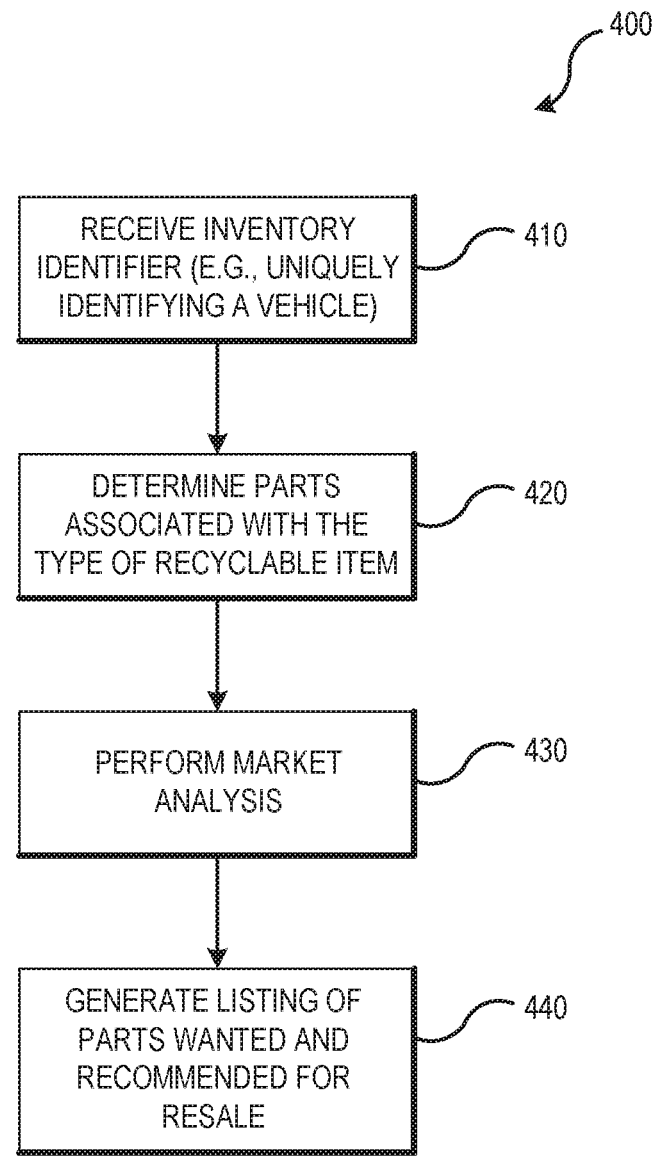
FIG. 4 is a flowchart with a set of operations for generating a list of parts associated with a self-service recycling assembly in accordance with some embodiments of the present invention.

FIG. 4 is a flowchart with a set of operations 400 for generating a list of parts associated with an automobile or other self-service recycling assembly in accordance with some embodiments of the present invention. The operations illustrated in FIG. 4 may be performed in some embodiments by valuation module 235, market analysis module 240, a processor, and/or other modules, engines, or components of the server 120. As illustrated in FIG. 4, receiving operation 410 receives an inventory identifier that uniquely identifies an automobile or other self-service recyclable assembly. For example, in some embodiments, the inventory identifier can be generated by the user scanning a QR code or a bar code, or manually entering the unique identifier.

Once the inventory identifier has been received, determination operation 420 determines a generic set of parts associated with the type of automobile or other recyclable assembly. Analysis operation 430 performs a market analysis on the set of parts to determine which ones are being actively sought after, how quickly the parts sell, the average, maximum, and minimum price at which the parts are being sold, and the expected profit, along with other market information. Generating operation 440 generates a listing of parts wanted and recommended for resale which is then presented to the user who submitted the inventory identifier.

Figure 5:
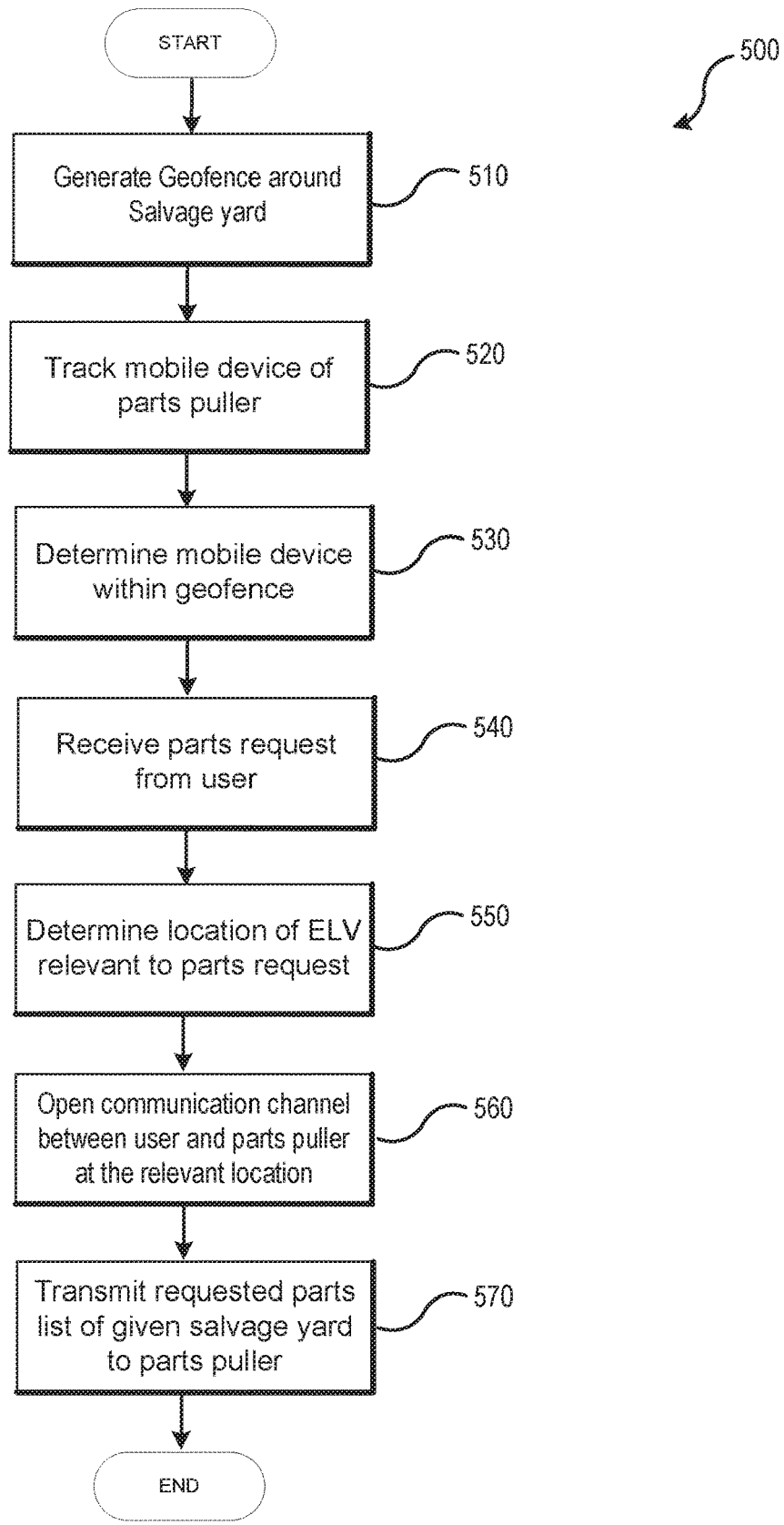
FIG. 5 is a flowchart with a set of operations for connecting buyers and sellers in accordance with various embodiments of the present invention.

FIG. 5 is a flowchart with a set of operations 500 for connecting buyers and sellers in accordance with various embodiments of the present invention. In step 510, the server generates a geofence around a salvage yard. In practice, this may occur around many salvage yards in order to generate a more complete, wide-reaching system. The geofence may be established via GPS coordinates, wireless network range, or another suitable method to generate a geofence known in the art.

In step 520, the server tracks mobile devices of parts puller users. The tracking is performed with reference to a geofence. While inside a geofence, the parts pullers are tracked (via location sensors in their mobile devices) to specific locations. While outside a geofence, the parts puller is merely noted as not being at a salvage yard. In step 530, the server determines via location aware sensors on the mobile device that the mobile device of a parts puller is within the geofence of a given salvage yard. The parts puller is marked by the server as "In the Yard". In some embodiments, "In the Yard" status is based on establishment of a predetermined radius from the latitudinal and longitudinal coordinates on file for each of the auto recycling yards in the server. A parts puller within this pre-determined radius of such an auto recycling yard will be denoted as being "at a yard". The "at a yard" status is an opt in system, and a parts puller may disable the geolaction services between the server and their respective mobile device. When a parts puller's mobile device is identified as being "at a yard", the server can publicly denote that parts puller's location so that users of a web interface of the server can take advantage of that parts puller's proximity to salvage vehicles.

In step 540, the server receives a request from a searching user for a particular part of a type of automobile (e.g. make, model, and year). The searching user may enter the search request into a mobile application that communicates with the server, via a web browser, or via other suitable means known in the art. In step 550, the server determines via a parts database that an ELV of the type of automobile from the searching user's request is located at a particular salvage yard. The ELV vehicle included the search for part in its respective original equipment. Whether the ELV has the searched for part in the present, as the user web search is performed, is unclear. Before hands on examination, the requested part is merely suspected to be located at the salvage yard based on original equipment of the ELV. Verification of this involves inspection by a parts puller.

In step 560, the server opens a communication channel between the searching user and the mobile device held by a parts puller who is marked as "At the Yard". The communication channel is opened based on a confluence of the parts puller being at the particular yard, and that the particular yard includes in its inventory an ELV that has the requested part in its original equipment. Where multiple parts pullers fit this criteria, the searching user may select from the group. During the operation of the communication channel the searching user can relay part or all of their request to the parts puller user. The communication channel may access native communication applications on respective devices (e.g. such as a phone application or SMS texting). In some embodiments, a native messaging application within server client software enables the communication channel via any of text, voice, and/or video. In some embodiments, the communication channel is operated and hosted by the server, and specific contact information of the respective searching user and parts puller user are kept secret from one another.

To further aid in this endeavor, in some embodiments, the ELV's location (or general region/section of the salvage yard) within the yard is marked on a map displayed for one or both of the searching user and the parts puller on their respective user devices (e.g. the part's puller's mobile device and whichever interface the searching user has chosen, mobile phone, computer, tablet, etc.). The server may also show the parts puller's location similarly and update as the parts puller draws near the ELV.

Requests do not necessarily have to be synchronous with the confluence of events (e.g. having a parts puller at the yard). Instead, a request may happen long before, and the request is recorded. This may in turn incentivize a parts puller to visit a given salvage yard based on a list of requested parts that may be at a given salvage yard. In step 570, the server transmits a parts wanted list to other mobile devices associated with other parts puller users based on the determination that the respective other mobile device are not within the geofence, wherein the parts wanted list includes the particular part and a reference to the salvage yard including the ELV. This encourages the parts pullers to visit the salvage yard.

Once the parts puller has entered the yard, the searching user is provided a notification (e.g., push notification, email, browser alert, etc.) that the confluence of events has occurred, their request has a matching ELV at a particular salvage yard, and a parts puller is marked at the yard. The server enables the communication channel as discussed above.

Figure 6:
FIG. 6 is an example of an identifier that can be associated with each self-service recycling assembly in accordance with one or more embodiments of the present invention.

FIG. 6 is an example of an identifier 610 which can be associated with each self-service recycling assembly 620. As illustrated in FIG. 6, identifier 610 can be affixed to the self-service recycling assembly 620. Identifier 610 can include code 630 (e.g., a QR code), which can be scanned or entered by the user to identify recyclable assembly 620. When the user scans or enters code 630, a determination can be made regarding the demand for parts typically found on the assembly. For example, a determination may be made as to which parts are currently needed for Internet sales, recent prices for individual parts, and/or a list of vehicles that can use these parts. This information can then be presented to the user. Using this information, the user can determine if any of the identified parts remain on the vehicle and may purchase the parts from the SSAR facility for resale. The user may also submit information about the specific vehicle for use by other users of the self-service marketplace.

Figure 7:
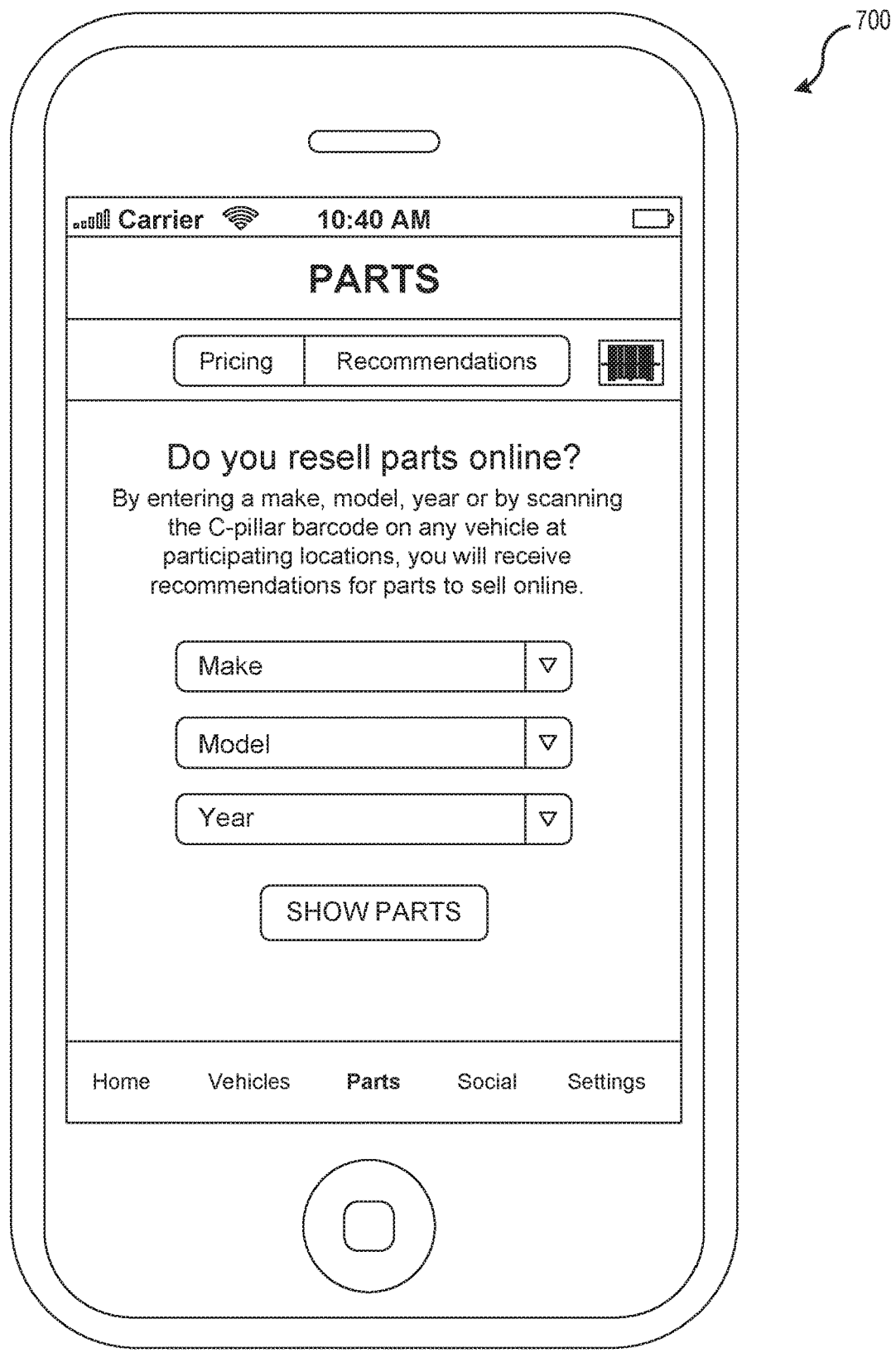
FIG. 7 is an example of a graphical user interface screen that can be used to generate a recommended set of parts of a self-service recycling assembly that may be valuable in accordance with some embodiments of the present invention.
Figure 8:
FIG. 8 is an example of a graphical user interface that allows the user to scan a quick response code to identify the self-service recycling assembly associated with the quick response code in accordance with various embodiments of the present invention.

Various embodiments of the present invention allow for users to identify information about types of recyclable assemblies in different ways. FIG. 7 is an example of a graphical user interface screen 700 which can be used to generate a recommended set of parts of a self-service recycling assembly that may be valuable. As illustrated in screen 700, the user may enter information (e.g., make, model, and year) about a type of vehicle. The information can then be submitted to the marketplace where a generic a list of parts typically found on the assembly (i.e., a generic parts list) can be retrieved. FIG. 8 is an example of a graphical user interface 800 that allows the user to scan a QR code to identify the vehicle or other self-service recycling assembly associated with the QR code.

Figure 9:
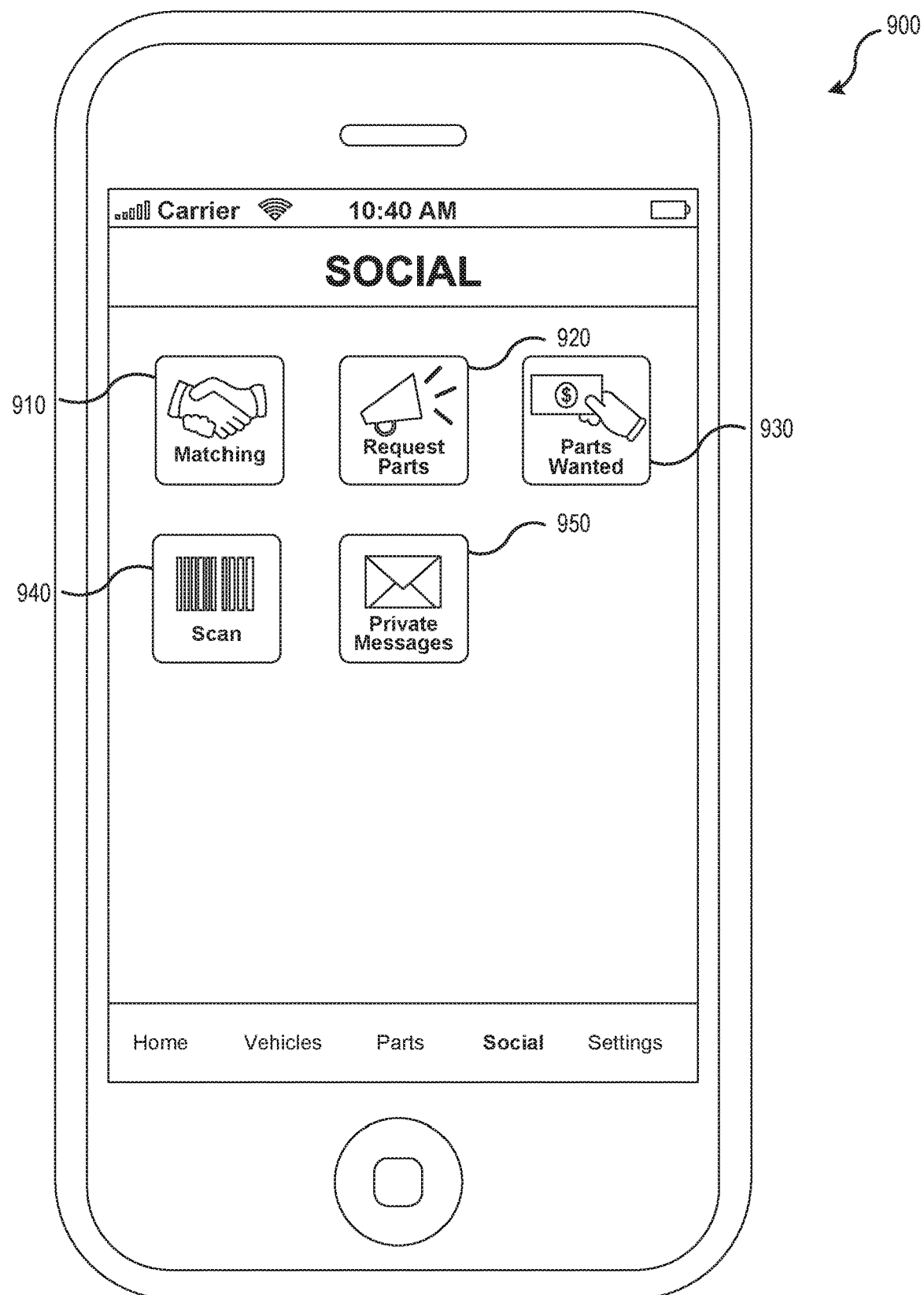
FIG. 9 is an example of a graphical user interface screen for navigating sections of a social platform for enhancing self-service recycling in accordance with one or more embodiments of the present invention.
Figure 10:
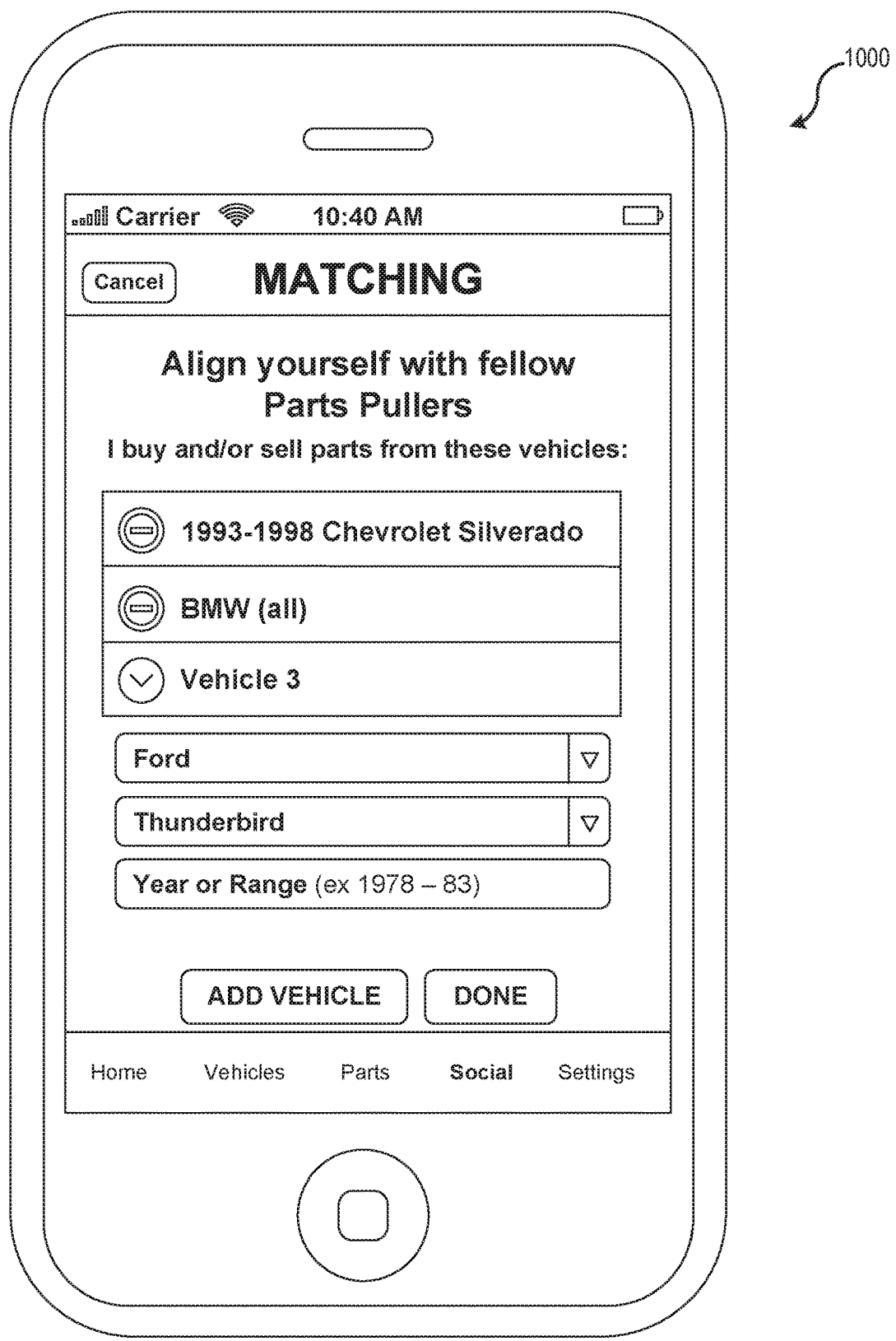
FIG. 10 illustrates an example of a graphical user interface screen that can be used for entering criteria for matching users in accordance with some embodiments of the present invention.
Figure 11:
FIG. 11 illustrates an example of a graphical user interface screen that can be used for seeing a listing of parts wanted by other users in accordance with various embodiments of the present invention.

FIG. 9 is an example of a graphical user interface screen 900 for navigating sections of a social platform for enhancing self-service recycling. As illustrated in FIG. 9, the user can choose between various functionalities such as matching, requesting parts, posting parts wanted, scanning codes on recyclable assemblies, and sending private messages. For example, when a user selects matching icon 910, request parts icon 920, parts wanted icon 930, scan icon 940, or private messaging icon 950, the system navigates to a graphical user interface screen to perform the desired functionality. FIG. 10 illustrates an example graphical user interface screen 1000 which can be used for entering criteria for matching users. FIG. 11 illustrates an example graphical user interface screen 1100 which can be used for viewing a list of parts wanted by other users.

Figure 12:
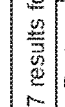
FIG. 12 illustrates an example of a graphical user interface screen with a list of search results from the self-service marketplace in accordance with one or more embodiments of the present invention.
Figure 13:
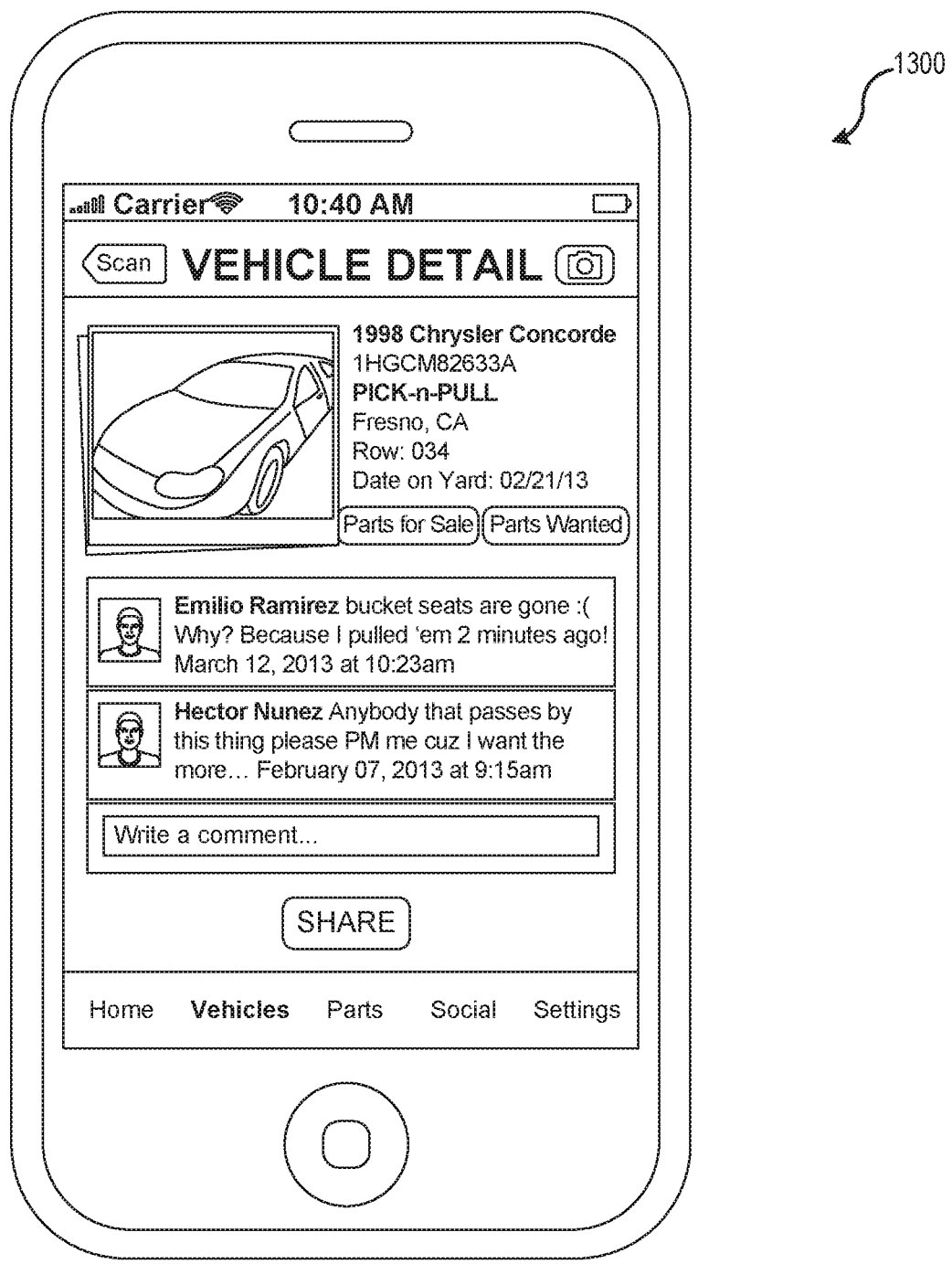
FIG. 13 illustrates an example graphical user interface screen with details and user comments for a recyclable assembly in accordance with some embodiments of the present invention.
Figure 14:
FIG. 14 illustrates an example of a graphical user interface screen with a list of parts available for sale through the self-service marketplace in accordance with various embodiments of the present invention.
Figure 15:
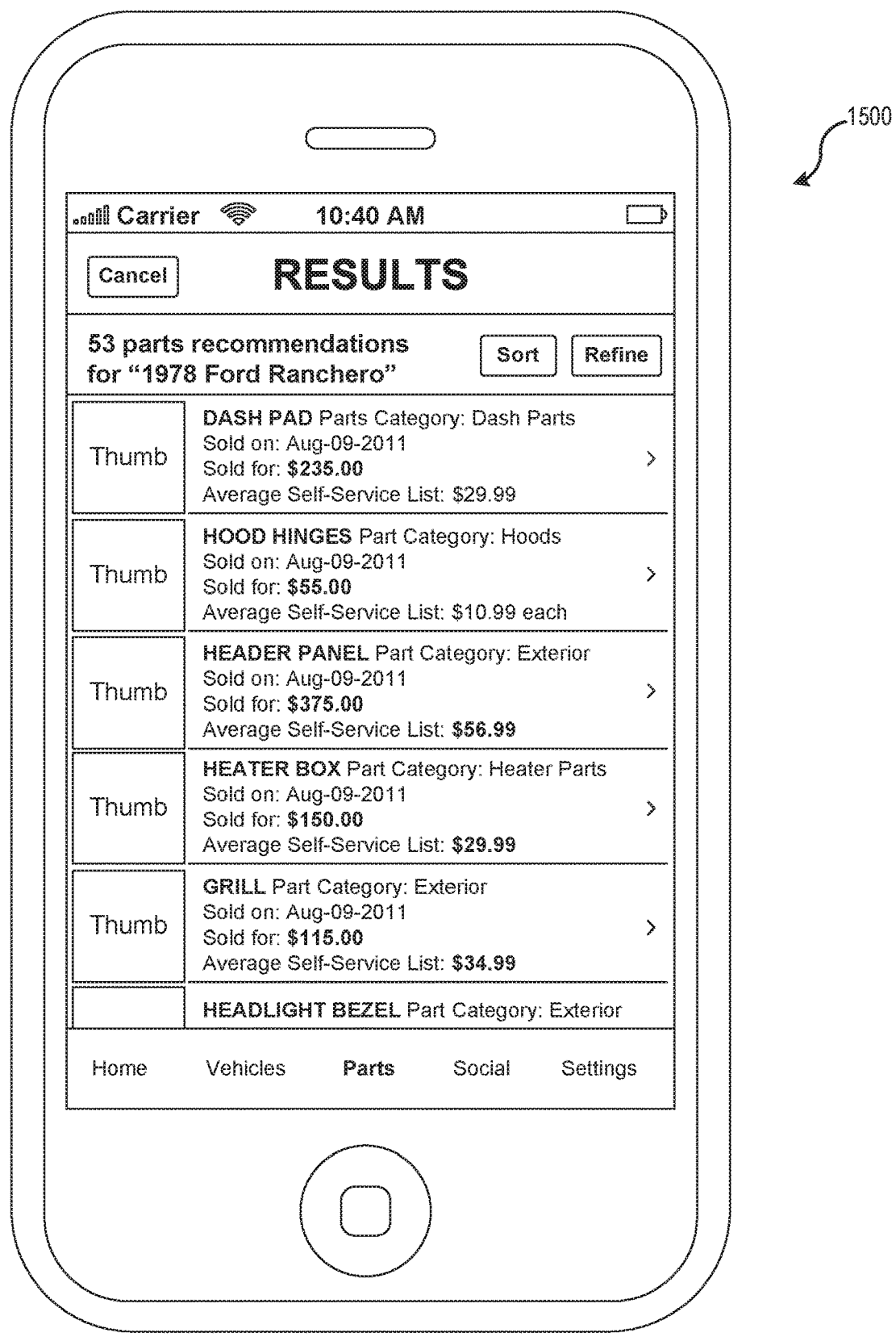
FIG. 15 illustrates an example of a graphical user interface screen showing the results of a market analysis in accordance with one or more embodiments of the present invention.

FIG. 12 illustrates a graphical user interface screen 1200 showing a list of search results from the server 120. FIG. 13 illustrates an example graphical user interface screen 1300 with details and user comments for an automobile. In addition, some embodiments provide for links that allow the user to quickly link to parts that are for sale for this type of recyclable assembly and view which parts are wanted for this type of recyclable assembly. FIG. 14 illustrates graphical user interface screen 1400 with a list of parts for sale through the self-service marketplace. FIG. 15 illustrates an example of a graphical user interface screen 1500 showing the results of a market analysis in accordance with various embodiments of the present invention.

Exemplary Computer System Overview

Figure 16:
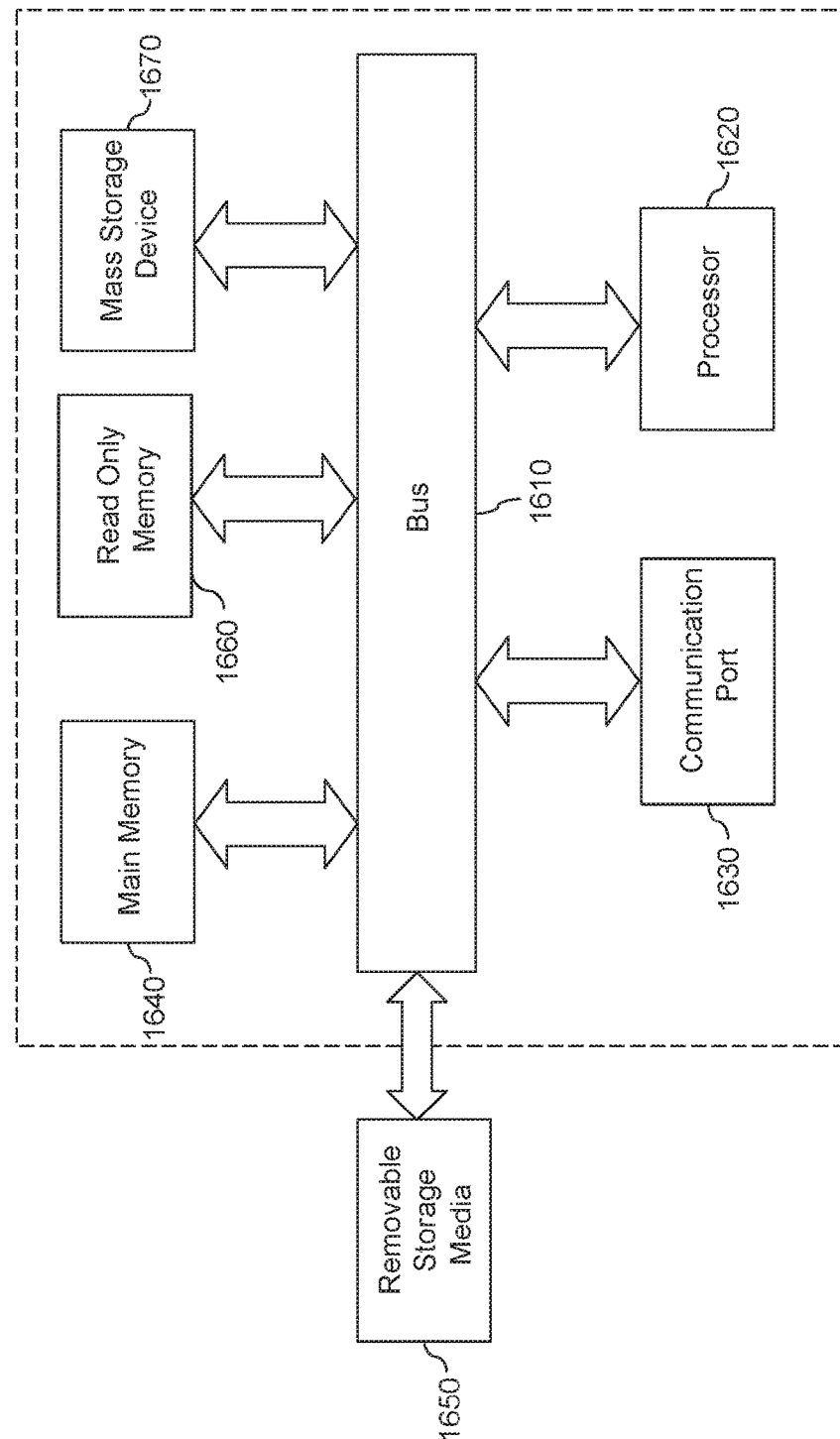
FIG. 16 illustrates an example of a computer system with which some embodiments of the present invention may be utilized.

Embodiments of the present invention include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 16 is an example of a computer system 1600 with which embodiments of the present invention may be utilized. According to the present example, the computer system includes a bus 1610, at least one processor 1620, at least one communication port 1630, a main memory 1640, a removable storage media 1650, a read-only memory 1660, and a mass storage 1670.

Processor(s) 1620 can be any known processor, such as, but not limited to, ARM or x86-type processors, such as Intel® Itanium® or Itanium 2® processor(s); AMD®

Opteron® or Athlon MP® processor(s); or Motorola® lines of processors. Communication port(s) 1630 can be any of an RS-232 port for use with a modem-based dialup connection, a 10/100 Ethernet port, or a Gigabit port using copper or fiber. Communication port(s) 1630 may be chosen depending on a network such as a Local Area Network (LAN), Wide Area Network (WAN), or any network to which the computer system 1600 connects. The communication port 1630 may also encompass wireless communications components, such as an IEEE 802.11, 3G/4G, or other wireless transceiver.

Main memory 1640 can be random access memory (RAM) or any other dynamic storage device(s) commonly known in the art. Read-only memory 1660 can be any static storage device(s) such as programmable read-only memory (PROM) chips for storing static information such as instructions for processor 1620.

Mass storage 1670 can be used to store information and instructions. For example, hard disks such as the Adaptec® family of SCSI drives, an optical disk, an array of disks such as RAID (e.g., the Adaptec family of RAID drives), or any other mass storage devices may be used.

Bus 1610 communicatively couples processor(s) 1620 with the other memory, storage, and communication blocks. Bus 1610 can be a PCI/PCI-X or SCSI based system bus depending on the storage devices used.

Removable storage media 1650 can be any kind of external hard drives, floppy drives, IOMEGA® Zip Drives, compact disc-read-only memory (CD-ROM, compact disk re-writable (CD-RW), and/or digital video disk read-only memory (DVD-ROM).

The computer system described in FIG. 16 may be a standalone computer or part of client-server system. In addition, various application programming interfaces (API) may also be used which allow certain parts of the self-service recycling system and third-party systems to interact with each other in a standardized way. For example, one or more APIs may be used to allow third-party yards to submit inventory to a self-service recycling system database and/or allow versions of the mobile applications and websites to query and retrieve information regarding the inventory. These computing components described above are meant to exemplify some types of possibilities. In no way should the aforementioned examples limit the scope of the invention, as they are only exemplary embodiments.

In conclusion, the present invention provides novel systems, methods, and arrangements for self-service recycling. While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations that fall within the scope of the claims, together with all equivalents thereof. Therefore, the above description should not be taken as limiting the scope of the invention, which is defined by the appended claims.

What is claimed is:

1. A method for mobile device monitoring of an end-of-life vehicle (ELV) salvage network utilizing salvage pickers to verify available components on ELVs comprising:

generating, by a server, a geofence around a salvage yard, the geofence associated with a set of global positioning system (GPS) coordinates;

tracking, by the server, a mobile device of a salvage picker user;

receiving, by the server, a request from a searching user for a particular part of a type of automobile;

determining, by the server, via a parts database that an ELV of the type of automobile that included the particular part within original equipment is located at the salvage yard;

determining, by the server, via location aware sensors on the mobile device that the GPS coordinates of the mobile device are within the set of GPS coordinates associated with the geofence;

opening, by the server, a communication channel between the searching user and the mobile device via a web-based application based on the determination that the mobile device is within the geofence and the receipt of the request;

transmitting, by the server, a parts wanted list to other mobile devices associated with other salvage picker users based on the determination that the respective other mobile devices are not within the geofence, wherein the parts wanted list includes the particular part and a reference to the salvage yard including the ELV.

2. The method of claim 1, wherein said parts wanted list is limited by parts included as original equipment on a plurality of ELVs that are associated with the salvage yard.

3. The method of claim 1, wherein the request from the searching user includes a make, model, and year of the type of automobile.

4. The method of claim 1, further comprising:

transmitting, by the server, a location of the ELV of the type of automobile that included the particular part within original equipment within the salvage yard to the mobile device in response to a communication from the searching user to the salvage picker user; and rendering, via a mobile application, the location of the ELV on the mobile device including a map and framed with reference to a present location of the mobile device.

5. The method of claim 1, further comprising:

integrating, by the server, the request with a plurality of other requests into a market analysis database.

6. The method of claim 5, wherein the market analysis database includes an estimated price of salvaged parts based on the integration of the request with the plurality of other requests.

7. The method of claim 1, wherein the parts database is updated via in-person scans of codes on ELVs in the salvage yard.

8. The claim of claim 1, further including a plurality of geofences each positioned around a plurality of salvage yards.

9. A method for mobile device monitoring of an end-of-life vehicle (ELV) salvage network utilizing salvage pickers to verify available components on ELVs comprising:

generating, by a server, a geofence around a salvage yard, the geofence associated with a set of global positioning system (GPS) coordinates;

tracking, by the server, a mobile device of a salvage picker user;

receiving, by the server, a request from a searching user for a particular part of a type of automobile;

determining, by the server, via a parts database that an ELV of the type of automobile that included the particular part within original equipment is located at the salvage yard;

determining, by the server, via location aware sensors on the mobile device that the GPS coordinates of the mobile device are within the set of GPS coordinates associated with the geofence; and opening, by the server, a communication channel between the searching user and the mobile device via a web-based application based on the determination that the mobile device is within the geofence and the receipt of the request.

10. The method of claim 9, wherein said parts wanted list is limited by parts included as original equipment on a plurality of ELVs that are associated with the salvage yard.

11. The method of claim 9, wherein the request from the searching user includes a make, model, and year of the type of automobile.

12. The method of claim 9, further comprising:

transmitting, by the server, a location of the ELV of the type of automobile that included the particular part within original equipment within the salvage yard to the mobile device in response to a communication from the searching user to the salvage picker user; and rendering, via a mobile application, the location of the ELV on the mobile device including a map and framed with reference to a present location of the mobile device.

13. The method of claim 9, further comprising:

integrating, by the server, the request with a plurality of other requests into a market analysis database.

14. The method of claim 13, wherein the market analysis database includes an estimated price of salvaged parts based on the integration of the request with the plurality of other requests.

15. A system for mobile device monitoring of an end-of-life vehicle (ELV) salvage network utilizing salvage pickers to verify available components on ELVs comprising:

a processor; and a memory including instructions that when executed are configured to cause the processor to:

generate a geofence around a salvage yard, the geofence associated with a set of global positioning system (GPS) coordinates;

track a mobile device of a salvage picker user;

receive a request from a searching user for a particular part of a type of automobile;

determine via a parts database that an ELV of the type of automobile that included the particular part within original equipment is located at the salvage yard;

determine via location aware sensors on the mobile device that the GPS coordinates of the mobile device are within the set of GPS coordinates associated with the geofence; and open a communication channel between the searching user and the mobile device via a web-based application based on the determination that the mobile device is within the geofence and the receipt of the request.

16. The system of claim 15, wherein said parts wanted list is limited by parts included as original equipment on a plurality of ELVs that are associated with the salvage yard.

17. The system of claim 15, wherein the request from the searching user includes a make, model, and year of the type of automobile.

18. The system of claim 15, wherein the memory further includes instructions that when executed are configured to cause the processor to:

transmit a location of the ELV of the type of automobile that included the particular part within original equipment within the salvage yard to the mobile device in response to a communication from the searching user to the salvage picker user; and render the location of the ELV on the mobile device including a map and framed with reference to a present location of the mobile device.

19. The system of claim 15, wherein the memory further includes instructions that when executed are configured to cause the processor to:

integrate the request with a plurality of other requests into a market analysis database.

20. The system of claim 19, wherein the market analysis database includes an estimated price of salvaged parts based on the integration of the request with the plurality of other requests.

* * * * *